Nov. 27, 1923.  1,475,909
J. WASSERMAN
MOTOR VEHICLE CLUTCH CONTROL
Filed July 14, 1921
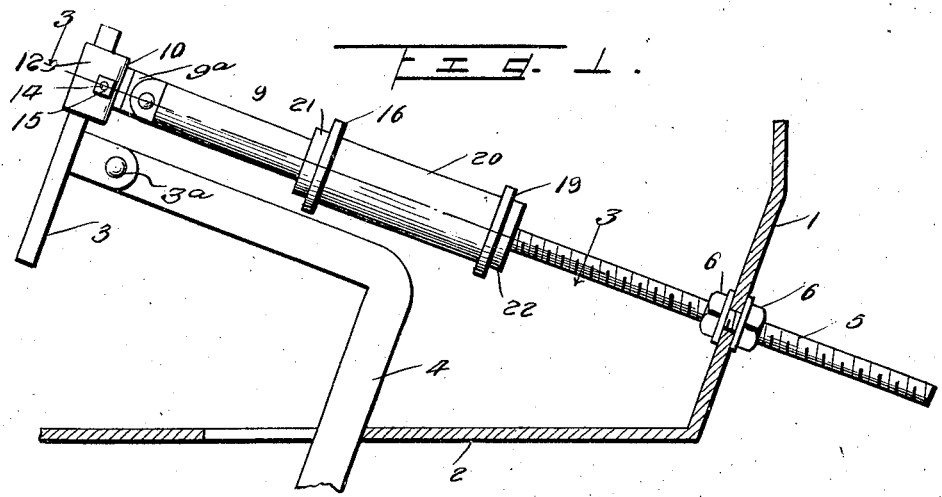
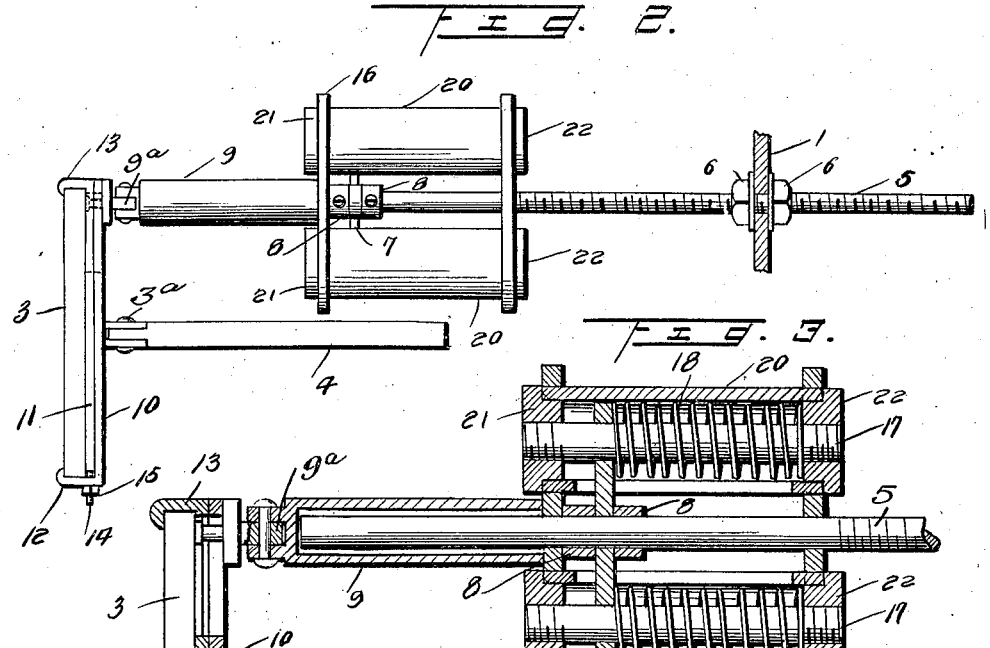
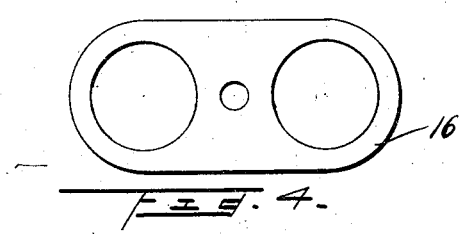
Inventor
J. Wasserman
By
Attorney Patented Nov. 27, 1923.

1,475,909

UNITED STATES PATENT OFFICE.

JACOB WASSERMAN, OF BROOKLYN, NEW YORK.

MOTOR-VEHICLE CLUTCH CONTROL.

Application filed July 14, 1921. Serial No. 484,814.

*To all whom it may concern:*

Be it known that I, JACOB WASSERMAN, a citizen of the United States, residing at Brooklyn, in the county of Kings and State of New York, have invented certain new and useful Improvements in Motor-Vehicle Clutch Controls; and I do hereby declare the following to be a full, clear, and exact description of the invention, such as will enable others skilled in the art to which it appertains to make and use the same.

The motive plant and transmission of motor vehicles includes a clutch which is disconnected or released when the vehicle is at rest or when shifting gears and the engine is idling. When engaging the clutch usually the action is sudden unless extreme care is exercised or the operator is experienced, and as a result the vehicle starts off with a jerk which besides being unpleasant, causes a severe strain on the engine and transmission which in time is disastrous.

The present invention aims to provide means which insures a gradual engagement of the clutch elements whereby the vehicle starts smoothly and without usual strain on the engine and transmission.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is an elevation of a clutch control embodying the invention showing the same applied.

Figure 2 is a top plan view of the clutch control and the clutch arm and pedal to which it is applied.

Figure 3 is a sectional view taken on the line 3—3 of Figure 1, and

Figure 4 is a detail plan view of one of the cross pieces.

Corresponding and like parts are referred to in the following description and designated in the several views of the drawing by like reference characters.

To demonstrate the application of the invention a portion of the dash and a portion of the floor of a motor vehicle are shown, these parts being designated by the numerals 1 and 2 respectively. The clutch shifting pedal 3 is carried by an arm 4, the latter operating through a slot in the floor 2 and being mounted in the usual way depending upon the type or make of vehicle to which the invention is applied. A rod 5 is secured to the dash 1 or other convenient part of the vehicle and remains stationary when properly adjusted. As indicated a pair of clamp nuts 6 threaded on the rod 5 clamp the dash 1 therebetween and secure the rod in the required adjusted position. A cross bar 7 is mounted upon the rod 5 and held between set collars 8 secured to the rod at a determinate position.

A casing 9 is slidably mounted upon the rod 5 and is provided with a clamp which engages the pedal 3. The clamp comprises plates 10 and 11 arranged one against the other, the plate 10 having a jaw 12 at one end and the plate 11 having a jaw 13 at the opposite end and provided with a threaded stem 14 which passes loosely through an opening in the jaw 12 and receives a clamp nut 15 whereby the plates 10 and 11 are relatively moved to clamp the pedal 3 between the jaws 12 and 13.

The part 9 is provided at its inner end with a cross piece 16 which is soldered, brazed or otherwise secured thereto to move therewith. Parallel guide rods 17 are connected to the cross piece 16 and are disposed upon opposite sides of the rod 5. The guide rods 17 pass loosely through end portions of the cross bar 7 and receive expansible helical springs 18 which are confined between the cross bar 7 and a companion cross bar 19 loose on the rod 5 and connected to the guide rods 17 so as to move therewith. Tubes 20 house the springs 18 and guide rods 17 and move with the cross piece 16 and cross bar 19 to which they are brazed, soldered or otherwise connected. Flange nuts 21 and 22 having screw thread connection with opposite ends of the guide rods 17 secure them to the tubes 20. The tubes 20 are soldered or otherwise secured to the cross pieces 16 and 19 and are longitudinally slotted along their inner sides to receive the ends of the cross bar 7. The tension of the springs 18 is such as not to interfere with the action of the clutch operating spring and the springs 18 may be interchangeable so as to be replaced by springs of proper tension when adapting the invention for a particular vehicle.

The invention operates to prevent the sudden engagement of the clutch with the result that the vehicle starts without any jar or jolt such as commonly experienced when the clutch grips suddenly. The control is automatic and in the event of the operator suddenly releasing the clutch pedal the invention comes into play to prevent sudden gripping of the clutch and causes the same to grip slowly with the result that the vehicle starts smoothly without any appreciable jerk and without producing any unusual strain upon the engine and transmission.

The pedal 3 is pivoted to the arm 4, at $3^a$, and the clamp 10 may be connected to the sleeve 9 by means of a link $9^a$ whereby to admit of movement of the pedal when it is required to operate the same. Moreover, the rod 5 may be of such construction as to yield and thereby permit of operation of the parts when actuating the pedal 3.

Having thus described the invention, what I claim is:—

1. A motor vehicle clutch control comprising a fixed member, a crossbar secured to the fixed member, a crosspiece slidable on said fixed member, a casing slidable on the fixed member and connected to the said crosspiece, means for connecting the casing with the clutch pedal, tubes on opposite sides of the fixed member and connected to the crosspiece, and expansible helical springs within the tubes and confined between the said crossbar and the ends of the tubes remote from said crosspiece.

2. A motor vehicle clutch control comprising a fixed member, a cross bar carried thereby, a movable member slidable on the fixed member, a clamp carried by the movable member, guide rods upon opposite sides of the fixed member and carried by the said movable member, a cross bar connecting the guide rods, expansible helical springs mounted upon the guide rods and confined between the said cross bars and slotted tubes receiving the guide rods and springs.

3. A motor vehicle clutch control comprising a rod, a crossbar secured to the rod, crosspieces slidable on the rod, tubes connecting the crosspieces and receiving the ends of the crossbar, guides within the tubes and passing loosely through the ends of the crossbar, flanged nuts securing the guides to the ends of the tubes, expansible helical springs within the tubes and surrounding the said guides and confined between the crossbar and the nuts at the lower ends of the tubes, a casing slidable on the rod and connected to the upper crosspiece, and means connecting the casing with the clutch pedal.

In testimony whereof I affixed my signature in presence of two witnesses.

JACOB WASSERMAN.

Witnesses:
  SAM KLEIN,
  SAM ROSOFF.